(12) United States Patent
Hatanaka et al.

(10) Patent No.: US 12,216,235 B2
(45) Date of Patent: Feb. 4, 2025

(54) SCINTILLATOR PANEL, RADIATION DETECTOR, SCINTILLATOR PANEL MANUFACTURING METHOD, AND RADIATION DETECTOR MANUFACTURING METHOD

(71) Applicant: HAMAMATSU PHOTONICS K.K., Hamamatsu (JP)

(72) Inventors: Masashi Hatanaka, Hamamatsu (JP); Haruki Yamaji, Hamamatsu (JP); Kazuhiro Shirakawa, Hamamatsu (JP); Keisuke Goto, Hamamatsu (JP); Jun Sakurai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/766,572

(22) PCT Filed: Jul. 9, 2020

(86) PCT No.: PCT/JP2020/026854
§ 371 (c)(1),
(2) Date: Apr. 5, 2022

(87) PCT Pub. No.: WO2021/079567
PCT Pub. Date: Apr. 29, 2021

(65) Prior Publication Data
US 2024/0103189 A1    Mar. 28, 2024

(30) Foreign Application Priority Data

Oct. 24, 2019  (JP) ................................. 2019-193421

(51) Int. Cl.
*G01T 1/202*    (2006.01)
(52) U.S. Cl.
CPC .................................. *G01T 1/202* (2013.01)

(58) Field of Classification Search
None
See application file for complete search history.

(56) References Cited

U.S. PATENT DOCUMENTS 3,855,035 A * 12/1974 Bates, Jr. ............... B32B 27/283
216/99
4,145,609 A *  3/1979 Takami ................. G01T 1/1642
250/361 R (Continued)

FOREIGN PATENT DOCUMENTS

CN          101419289 B      1/2012
EP           1365261 B1     12/2016

(Continued)

OTHER PUBLICATIONS

International Preliminary Report on Patentability mailed May 5, 2022 for PCT/JP2020/026854.

*Primary Examiner* — David P Porta
*Assistant Examiner* — Djura Malevic
(74) *Attorney, Agent, or Firm* — Faegre Drinker Biddle & Reath LLP

(57) ABSTRACT

A scintillator panel includes: a first flexible support body having a first surface and a second surface on a side opposite to the first surface; a scintillator layer formed on the first surface and containing a plurality of columnar crystals; a second flexible support body provided on the second surface; an inorganic layer provided on the second flexible support body so as to be interposed between the second surface and the second flexible support body; and a first adhesive layer bonding the second surface and the inorganic layer to each other. A radiation detector includes: the scintillator panel; and a sensor panel including a photoelectric conversion element, in which the scintillator panel is pro- (Continued)

vided on the sensor panel such that the first surface is on the sensor panel side with respect to the second surface.

9 Claims, 5 Drawing Sheets

(56) References Cited

U.S. PATENT DOCUMENTS

| | | | | |
|---|---|---|---|---|
| 4,939,018 A * | 7/1990 | Kohda | ................... | G21K 4/00 |
| | | | | 428/192 |
| 5,023,461 A * | 6/1991 | Nakazawa | ................ | G21K 4/00 |
| | | | | 250/487.1 |
| 5,148,029 A * | 9/1992 | Persyk | .................. | G01T 1/2002 |
| | | | | 250/361 R |
| 5,308,980 A * | 5/1994 | Barton | ................. | H01L 27/1465 |
| | | | | 438/66 |
| 5,585,624 A * | 12/1996 | Asatourian | ......... | H01L 27/1465 |
| | | | | 257/E27.137 |
| 5,600,140 A * | 2/1997 | Asatourian | ............... | G01J 5/06 |
| | | | | 257/E27.137 |
| 5,610,389 A * | 3/1997 | Asatourian | ......... | H01L 27/1465 |
| | | | | 257/E27.137 |
| 5,714,760 A * | 2/1998 | Asatourian | ......... | H01L 27/1465 |
| | | | | 250/370.15 |
| 6,692,836 B2 * | 2/2004 | Reichert | ................. | G02B 5/22 |
| | | | | 428/689 |
| 6,800,836 B2 * | 10/2004 | Hamamoto | ............. | H04N 5/32 |
| | | | | 348/E3.032 |
| 6,835,936 B2 * | 12/2004 | Okada | ..................... | G01T 3/008 |
| | | | | 250/336.1 |
| 7,034,306 B2 * | 4/2006 | Homme | .................. | G01T 1/202 |
| | | | | 250/368 |
| 7,112,802 B2 * | 9/2006 | Ogawa | .................... | G01T 1/161 |
| | | | | 250/370.11 |
| 7,265,371 B2 * | 9/2007 | Shoji | ....................... | B32B 27/08 |
| | | | | 250/581 |
| 7,573,056 B2 * | 8/2009 | Nagata | .................. | G01T 1/2002 |
| | | | | 250/580 |
| 7,576,335 B2 * | 8/2009 | Shoji | .................. | C09K 11/7771 |
| | | | | 250/483.1 |
| 7,595,493 B2 * | 9/2009 | Okada | ..................... | G21K 4/00 |
| | | | | 250/370.11 |
| 7,718,974 B2 * | 5/2010 | Schulz | ...................... | G01T 1/20 |
| | | | | 250/370.11 |
| 7,897,938 B2 * | 3/2011 | Homme | ................... | B05D 1/60 |
| | | | | 250/484.4 |
| 8,304,735 B2 * | 11/2012 | Inoue | .................... | G01T 1/2928 |
| | | | | 250/361 R |
| 8,664,607 B2 * | 3/2014 | Iwakiri | ............. | H01L 27/14632 |
| | | | | 250/361 R |
| 8,669,528 B2 * | 3/2014 | Itaya | ..................... | G01T 1/2018 |
| | | | | 250/368 |
| 8,735,854 B2 * | 5/2014 | Sakai | ........................ | G01T 1/20 |
| | | | | 250/361 R |
| 8,822,940 B2 * | 9/2014 | Moon | ............... | H01L 27/14676 |
| | | | | 250/370.11 |
| 8,841,621 B2 * | 9/2014 | Nariyuki | ............... | G01T 1/2002 |
| | | | | 250/366 |
| 8,853,808 B2 * | 10/2014 | Homma | .............. | G01T 1/20189 |
| | | | | 257/431 |
| 8,912,499 B2 * | 12/2014 | Asagiri | .................. | G01T 1/2985 |
| | | | | 250/370.11 |
| 8,957,383 B2 * | 2/2015 | Sasaki | .................... | G01T 1/202 |
| | | | | 250/361 R |
| 8,973,245 B2 * | 3/2015 | Shoji | ..................... | G01T 1/2006 |
| | | | | 29/469 |
| 9,006,665 B2 * | 4/2015 | Nagano | ................ | G01T 1/2002 |
| | | | | 250/363.01 |
| 9,054,012 B2 * | 6/2015 | Nomura | ............ | H01L 27/14685 |
| 9,366,767 B2 * | 6/2016 | Inoue | .................. | G01T 1/202 |
| 9,535,170 B2 * | 1/2017 | Jonishi | .................... | G01T 1/202 |
| 9,568,617 B2 * | 2/2017 | Ichimura | ................... | G01T 7/00 |
| 9,864,078 B2 * | 1/2018 | Sumi | ...................... | G03B 42/04 |
| 10,345,455 B2 * | 7/2019 | Ishii | ...................... | A61B 6/4233 |
| 10,379,229 B2 * | 8/2019 | Yoshida | ................ | H01L 31/032 |
| 11,099,283 B2 * | 8/2021 | Yamaji | ..................... | G01T 1/20 |
| 11,156,727 B2 * | 10/2021 | Shedlock | ............ | G01T 1/20186 |
| 11,624,716 B2 * | 4/2023 | Ushikura | ............... | G01N 23/04 |
| | | | | 378/62 |
| 11,719,835 B2 * | 8/2023 | Wu | ...................... | G01T 1/20186 |
| | | | | 250/370.11 |
| 11,786,194 B2 * | 10/2023 | Okada | ................. | G01T 1/20188 |
| | | | | 250/366 |
| 2002/0017613 A1 * | 2/2002 | Homme | ................ | G01T 1/2002 |
| | | | | 250/483.1 |
| 2002/0066868 A1 * | 6/2002 | Shoji | ........................ | G21K 4/00 |
| | | | | 250/484.4 |
| 2002/0074502 A1 * | 6/2002 | Takabayashi | .......... | G03B 42/02 |
| | | | | 250/483.1 |
| 2002/0168793 A1 * | 11/2002 | Izumi | ................ | H01L 27/14658 |
| | | | | 257/E31.09 |
| 2002/0192471 A1 * | 12/2002 | Homme | ..................... | G01T 1/20 |
| | | | | 428/408 |
| 2002/0195568 A1 * | 12/2002 | Mori | ................ | H01L 27/14663 |
| | | | | 250/370.11 |
| 2003/0160185 A1 * | 8/2003 | Homme | ............. | G01T 1/20183 |
| | | | | 250/483.1 |
| 2003/0173493 A1 * | 9/2003 | Homme | .............. | G01T 1/20187 |
| | | | | 29/595 |
| 2004/0000644 A1 * | 1/2004 | Homme | .............. | G01T 1/20188 |
| | | | | 250/361 R |
| 2004/0053001 A1 * | 3/2004 | Abrams | ................... | D06Q 1/14 |
| | | | | 156/279 |
| 2004/0089813 A1 * | 5/2004 | Takabayashi | ....... | G01T 1/20189 |
| | | | | 250/370.11 |
| 2004/0200973 A1 * | 10/2004 | Ogawa | .................... | G01T 1/161 |
| | | | | 250/370.11 |
| 2004/0211910 A1 * | 10/2004 | Izumi | ................ | H01L 27/14658 |
| | | | | 257/E31.09 |
| 2004/0211911 A1 * | 10/2004 | Hata | ...................... | G01T 1/1648 |
| | | | | 250/370.11 |
| 2004/0245474 A1 * | 12/2004 | Vieux | ....................... | G01T 1/20 |
| | | | | 250/370.11 |
| 2005/0072931 A1 * | 4/2005 | Albagli | ................. | G01T 1/2019 |
| | | | | 250/370.11 |
| 2006/0108683 A1 * | 5/2006 | Takeda | ............. | H01L 27/14663 |
| | | | | 257/723 |
| 2007/0051896 A1 * | 3/2007 | Okada | .................... | G01T 1/202 |
| | | | | 250/370.11 |
| 2007/0181252 A1 * | 8/2007 | Bohm | ................... | H01L 21/563 |
| | | | | 156/331.7 |
| 2007/0205371 A1 * | 9/2007 | Inoue | .................. | G01T 1/20189 |
| | | | | 250/370.11 |
| 2008/0142721 A1 | 6/2008 | Spahn | | |
| 2009/0283685 A1 * | 11/2009 | Takeda | ................. | A61B 6/4233 |
| | | | | 250/370.11 |
| 2011/0198505 A1 | 8/2011 | Ishida et al. | | |
| 2011/0309258 A1 * | 12/2011 | Ishida | ............... | H01L 27/14676 |
| | | | | 250/361 R |
| 2012/0223240 A1 * | 9/2012 | Ichimura | ............... | G01T 1/2002 |
| | | | | 428/688 |
| 2013/0112882 A1 * | 5/2013 | Osawa | ................ | G01T 1/20185 |
| | | | | 250/361 R |
| 2014/0284487 A1 * | 9/2014 | Sawada | ................. | G01T 1/2002 |
| | | | | 250/368 |
| 2014/0374608 A1 * | 12/2014 | Sasaki | .................... | H01L 31/115 |
| | | | | 250/366 |
| 2016/0041278 A1 * | 2/2016 | Gorouya | ................ | G01T 1/202 |
| | | | | 250/366 |
| 2016/0116606 A1 * | 4/2016 | Itaya | ..................... | G01T 1/2023 |
| | | | | 250/366 |
| 2024/0103189 A1 * | 3/2024 | Hatanaka | ................ | G01T 1/202 |

FOREIGN PATENT DOCUMENTS

| | | |
|---|---|---|
| JP | 2004-325445 A | 11/2004 |
| JP | 2008-249335 A | 10/2008 |
| JP | 2012-047723 A | 3/2012 |

(56) References Cited

FOREIGN PATENT DOCUMENTS

| | | | |
|---|---|---|---|
| JP | 2013-217913 | A | 10/2013 |
| JP | 5668691 | B2 | 2/2015 |
| JP | 2019-060876 | A | 4/2019 |
| TW | 1661213 | B | 6/2019 |
| TW | 201923382 | A | 6/2019 |
| WO | WO-2011/065302 | A1 | 6/2011 |

* cited by examiner (a)

(b)

(c)

(a)

(b)

(a)

(b)

SCINTILLATOR PANEL, RADIATION DETECTOR, SCINTILLATOR PANEL MANUFACTURING METHOD, AND RADIATION DETECTOR MANUFACTURING METHOD

TECHNICAL FIELD

The present disclosure relates to a scintillator panel, a radiation detector, a scintillator panel manufacturing method, and a radiation detector manufacturing method.

BACKGROUND ART

A scintillator panel is described in Patent Literature 1. In this scintillator panel, a phosphor layer converting radiation into light is provided on a support body. In addition, the scintillator panel has a metal thin film layer having a thickness in the range of 1 to 500 nm on the surface of the support body on the side opposite to the surface having the phosphor layer. The support body is a roll-shaped scintillator panel support body cut to a predetermined size. Further, the light-emitting and side surfaces of the phosphor layer and the side surface of the support body are covered with a moisture-resistant protective film.

CITATION LIST

Patent Literature

Patent Literature 1: Japanese Patent No. 5668691

SUMMARY OF INVENTION

Technical Problem

In the scintillator panel described above, moisture resistance is improved by the metal thin film layer and the moisture-resistant protective film. In the technical field described above, moisture resistance improvement is desired as described above. Meanwhile, in the scintillator panel described above, the surface of the metal thin film layer on the side opposite to the support body is exposed to the outside. Accordingly, it is difficult to ensure handleability in the scintillator panel described above.

An object of the present disclosure is to provide a scintillator panel, a radiation detector, a scintillator panel manufacturing method, and a radiation detector manufacturing method enabling moisture resistance improvement while ensuring handleability.

Solution to Problem

A scintillator panel according to the present disclosure includes: a first flexible support body having a first surface and a second surface on a side opposite to the first surface; a scintillator layer formed on the first surface and containing a plurality of columnar crystals; a second flexible support body provided on the second surface; an inorganic layer provided on the second flexible support body so as to be interposed between the second surface and the second flexible support body; and a first adhesive layer bonding the second surface and the inorganic layer to each other.

In this scintillator panel, the scintillator layer is formed on the first surface of the first flexible support body. Meanwhile, the inorganic layer is provided on the second surface of the first flexible support body via the first adhesive layer. Accordingly, in this scintillator panel, the inorganic layer suppresses moisture infiltration from the second surface side into the scintillator layer via the first flexible support body. Meanwhile, the inorganic layer may deteriorate due to contact during handling if the inorganic layer is exposed. On the other hand, the second flexible support body in this scintillator panel is disposed on the side of the inorganic layer opposite to the second surface of the first flexible support body, and thus the inorganic layer is protected from contact and deterioration of the inorganic layer is suppressed during handling. In this manner, in this scintillator panel, moisture resistance is improved while handleability is ensured. It should be noted that the side of the scintillator layer opposite to the first surface of the first flexible support body is usually provided with a sensor panel and so on and thus the necessity of moisture resistance improvement is relatively low.

The scintillator panel according to the present disclosure may include a protective layer provided so as to cover the first flexible support body, the scintillator layer, the second flexible support body, and the inorganic layer. In this case, the overall moisture resistance and handleability are further improved.

The scintillator panel according to the present disclosure may include a second adhesive layer bonding the inorganic layer and the second flexible support body to each other. In this manner, the inorganic layer may be bonded to the second flexible support body by an adhesive layer. In this case, the joining between the inorganic layer and the second flexible support body becomes stronger than in a case where, for example, the inorganic layer is formed by evaporation with respect to the second flexible support body.

In the scintillator panel according to the present disclosure, the first flexible support body and the second flexible support body may have a thickness of 50 μm or more and 250 μm or less in a first direction intersecting with the first surface, and the inorganic layer may have a thickness of 10 μm or more and 100 μm or less in the first direction and may be thinner than the first flexible support body and the second flexible support body in the first direction. By configuring the thickness of the inorganic layer relatively large in the range in which the inorganic layer is thinner than the first flexible support body and the second flexible support body as described above, radiolucency can be ensured and moisture resistance can be further improved at the same time.

In the scintillator panel according to the present disclosure, a difference between the thickness of the first flexible support body and the thickness of the second flexible support body in the first direction may be 0 or more and 90 μm or less. In this case, the overall warpage is suppressed since the difference in thickness is small between the first flexible support body and the second flexible support body.

In the scintillator panel according to the present disclosure, the inorganic layer may contain Al, Cu, Ti, Fe, or SUS as a material. In addition, in the scintillator panel according to the present disclosure, the first flexible support body and the second flexible support body may contain PET, PEN, PI, PP, PE, or PMMA as a material.

A radiation detector according to the present disclosure includes: the scintillator panel described above; and a sensor panel including a photoelectric conversion element, in which the scintillator panel is provided on the sensor panel such that the first surface is on the sensor panel side with respect to the second surface. This radiation detector includes the scintillator panel described above. Accordingly, with this radiation detector, handleability is ensured and moisture resistance is improved at the same time.

A scintillator panel manufacturing method according to the present disclosure includes: a step of forming a scintillator layer containing a plurality of columnar crystals on a first surface of a first flexible support body by an evaporation method; a step of preparing a second flexible support body provided with an inorganic layer; and a step of bonding the inorganic layer to the first flexible support body with a first adhesive layer such that the inorganic layer is interposed between a second surface of the first flexible support body on a side opposite to the first surface and the second flexible support body.

The scintillator layer is formed on the first surface of the first flexible support body by this manufacturing method. Meanwhile, the inorganic layer is provided on the second surface of the first flexible support body via an adhesive layer. Accordingly, in this scintillator panel, the inorganic layer suppresses moisture infiltration from the second surface side into the scintillator layer via the first flexible support body. Meanwhile, the inorganic layer may deteriorate due to contact during handling if the inorganic layer is exposed. On the other hand, by this method, the second flexible support body is disposed on the side of the inorganic layer opposite to the second surface of the first flexible support body, and thus the inorganic layer is protected from contact and deterioration of the inorganic layer is suppressed during handling. In this manner, the scintillator panel capable of improving moisture resistance while ensuring handleability is manufactured by this manufacturing method. It should be noted that the side of the scintillator layer opposite to the first surface of the first flexible support body is usually provided with a sensor panel and so on and thus the necessity of moisture resistance improvement is relatively low.

A radiation detector manufacturing method according to the present disclosure includes: a step of preparing the scintillator panel described above; a step of preparing a sensor panel including a photoelectric conversion element; and a step of providing the scintillator panel on the sensor panel such that the first surface is on the sensor panel side with respect to the second surface. The scintillator panel described above is used in this manufacturing method. Accordingly, a radiation detector capable of improving moisture resistance while ensuring handleability is manufactured.

Advantageous Effects of Invention

According to the present disclosure, a scintillator panel, a radiation detector, a scintillator panel manufacturing method, and a radiation detector manufacturing method enabling moisture resistance improvement while ensuring handleability can be provided.

DESCRIPTION OF EMBODIMENTS

Figure 1:
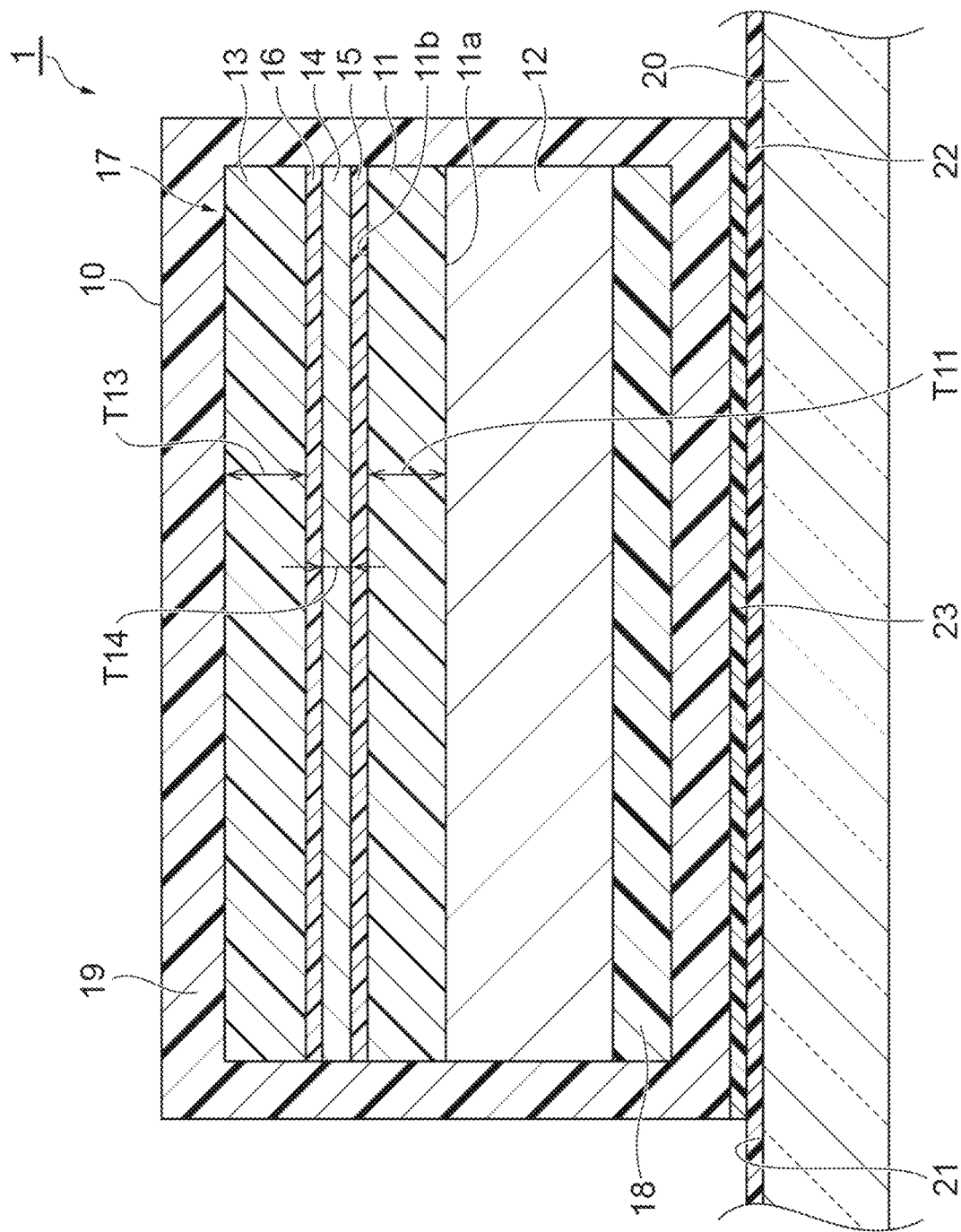
FIG. 1 is a schematic cross-sectional view illustrating a radiation detector according to the present embodiment.

Hereinafter, one embodiment will be described in detail with reference to the drawings. In the description of the drawings, the same or corresponding elements may be denoted by the same reference numerals with redundant description omitted.

The scintillator panel (and the radiation detector) according to the present embodiment converts (and detects) radiation such as X-rays into scintillation light such as visible light. In addition, the scintillator panel and the radiation detector (radiation imager) according to the present embodiment can be used in, for example, a medical X-ray diagnostic imaging apparatus such as a mammography apparatus, a chest examination apparatus, a CT apparatus, a dental intraoral imaging apparatus, and a radiation camera and a non-destructive inspection apparatus.

FIG. 1 is a schematic cross-sectional view illustrating the radiation detector according to the present embodiment. As illustrated in FIG. 1, a radiation detector 1 includes a scintillator panel 10 and a sensor panel 20. The scintillator panel 10 includes a first flexible support body 11, a scintillator layer 12, a second flexible support body 13, an inorganic layer 14, a first adhesive layer 15, a second adhesive layer 16, a protective layer 18, and a protective layer 19.

The first flexible support body 11 is formed in a flat plate shape here and has a first surface 11a and a second surface 11b on the side opposite to the first surface 11a. The first surface 11a and the second surface 11b are parallel to each other. The first flexible support body 11 is flexible. Being flexible means being elastically deformable. Examples of the material of the first flexible support body 11 include polyethylene terephthalate (PET), polyethylene naphthalate (PEN), polyimide (PI), polypropylene (PP), polyethylene (PE), and acrylic (PMMA). As an example, the material of the first flexible support body 11 is PET, PEN, PI, PP, PE, or PMMA. Here, the material of the first flexible support body 11 is PET. It should be noted that the first flexible support body 11 may have an anchor coat layer made of a thermoplastic resin (e.g. acrylic) on the forming surface of the scintillator layer 12 so that adhesiveness is enhanced in relation to the scintillator layer 12. When the scintillator layer 12 is configured by a plurality of columnar crystals in particular, the crystallinity of the roots of the columnar crystals is improved by the anchor coat layer.

The scintillator layer 12 is formed on the first surface 11a. The scintillator layer 12 generates scintillation light in response to radiation incidence from the second surface 11b side. The scintillator layer 12 contains a plurality of columnar crystals. As an example, the scintillator layer 12 is made of a plurality of columnar crystals. The scintillator layer 12 is suitable for high-resolution imaging by each columnar crystal having a light guide effect.

Examples of the material of the scintillator layer 12 include a material containing cesium iodide (CsI) as a main component such as CsI:Tl and CsI:Na, a material containing sodium iodide (NaI) as a main component such as Nat Tl, strontium iodide ($SrI_3$), lutetium iodide ($LuI_3$), barium fluoride (BaF2), and GOS. Here, the material of the scintillator layer 12 is a material containing CsI as a main component. The scintillator layer 12 can be formed by, for example, an evaporation method. The thickness of the scintillator layer 12 is, for example, 10 μm or more and 3000 μm or less. As a specific example, the thickness is 600 μm.

The second flexible support body 13 is formed in, for example, a flat plate shape. The second flexible support body 13 is flexible. Examples of the material of the second flexible support body 13 include polyethylene terephthalate (PET), polyethylene naphthalate (PEN), polyimide (PI), polypropylene (PP), polyethylene (PE), and acrylic (PMMA). As an example, the material of the second flexible support body 13 is PET, PEN, PI, PP, PE, or PMMA. Here, the material of the second flexible support body 13 is PET. In addition, the material of the first flexible support body 11 and the material of the second flexible support body 13 are, for example, the same.

The inorganic layer 14 is interposed between the second surface 11b of the first flexible support body 11 and the second flexible support body 13. The inorganic layer 14 is provided on the second flexible support body 13. The second flexible support body 13 provided with the inorganic layer 14 is bonded to the second surface 11b of the first flexible support body 11 by the first adhesive layer 15. In other words, the first adhesive layer 15 bonds the second surface 11b and the inorganic layer 14 to each other.

The second adhesive layer 16 is interposed between the inorganic layer 14 and the second flexible support body 13. The inorganic layer 14 is bonded to the second flexible support body 13 by the second adhesive layer 16. In other words, the second adhesive layer 16 bonds the inorganic layer 14 and the second flexible support body 13 to each other. In this manner, the scintillator layer 12, the first flexible support body 11, the inorganic layer 14, and the second flexible support body 13 are laminated in this order to form a laminated body 17 and are integrated by the first adhesive layer 15 and the second adhesive layer 16.

The inorganic layer 14 is made of an inorganic material. As an example, the material of the inorganic layer 14 is a metal. More specifically, examples of the material of the inorganic layer 14 include aluminum (Al), copper (Cu), titanium (Ti), iron (Fe), and SUS. As an example, the material of the inorganic layer 14 is Al.

A thickness T11 of the first flexible support body 11 in a first direction intersecting with the first surface 11a (and the second surface 11b) is, for example, 50 μm or more and 250 μm or less. Likewise, a thickness T13 of the second flexible support body 13 in the first direction is, for example, 50 μm or more and 250 μm or less. The difference between the thickness T11 of the first flexible support body 11 and the thickness T13 of the second flexible support body 13 is, for example, 0 or more and 90 μm or less. As an example, the thickness T11 of the first flexible support body 11 is equal to the thickness T13 of the second flexible support body 13 (the difference in thickness is 0). A thickness T14 of the inorganic layer 14 in the first direction is, for example, 10 μm or more and 100 μm or less. The thickness T14 is smaller than the thickness T11 of the first flexible support body 11 and the thickness T13 of the second flexible support body 13. The thickness T14 of the inorganic layer 14 is, for example, 30 μm.

The protective layer 18 is provided on the surface of the scintillator layer 12 on the side opposite to the first flexible support body 11. The protective layer 19 is provided so as to cover the laminated body 17 (that is, the first flexible support body 11, the scintillator layer 12, and the inorganic layer 14) and the protective layer 18. As a result, the plurality of (two here) protective layers 18 and 19 are disposed on the surface of the scintillator layer 12 on the side opposite to the first flexible support body 11. The material of the protective layers 18 and 19 is, for example, an organic material such as a resin, examples of which include parylene (polyparaxylene).

The sensor panel 20 includes a photoelectric conversion element. The sensor panel 20 detects the scintillation light generated by the scintillator panel 10 and outputs a signal corresponding to the scintillation light. The sensor panel 20 has a mounting surface 21. A protective layer 22 is formed on the mounting surface 21. Examples of the material of the protective layer 22 include an oxide film, a nitride film, a fluorine-based resin, and an aromatic resin. It should be noted that the protective layer 22 may not be formed.

The scintillator panel 10 is mounted on the mounting surface 21 via the protective layer 22. More specifically, the scintillator panel 10 is mounted on the mounting surface 21 such that the first surface 11a of the first flexible support body 11 and the scintillator layer 12 face the mounting surface 21. A third adhesive layer 23 is interposed between the scintillator panel 10 and the mounting surface 21 (protective layer 22). The scintillator panel 10 and the sensor panel 20 are bonded to each other by the third adhesive layer 23. It should be noted that the first adhesive layer 15, the second adhesive layer 16, and the third adhesive layer 23 can be configured by any adhesive and sticky material, examples of which include a tape-shaped adhesive material (double-sided tape).

Figure 2:
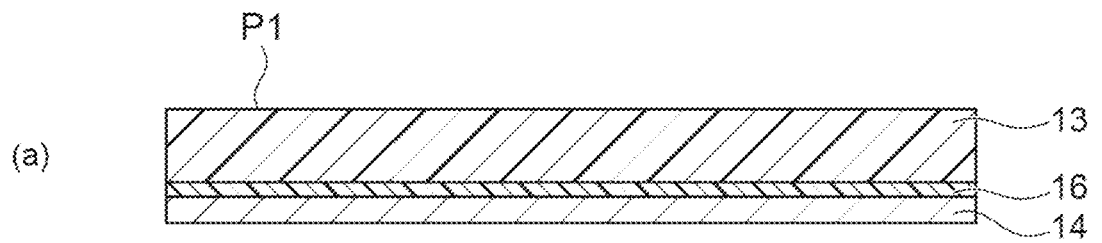
FIG. 2 is a schematic cross-sectional view illustrating one step of a method for manufacturing the radiation detector illustrated in FIG. 1.
Figure 2:
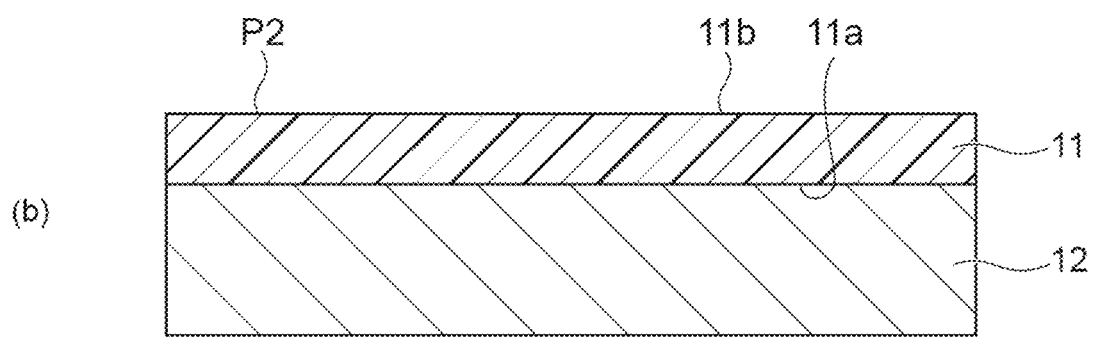
Figure 2:
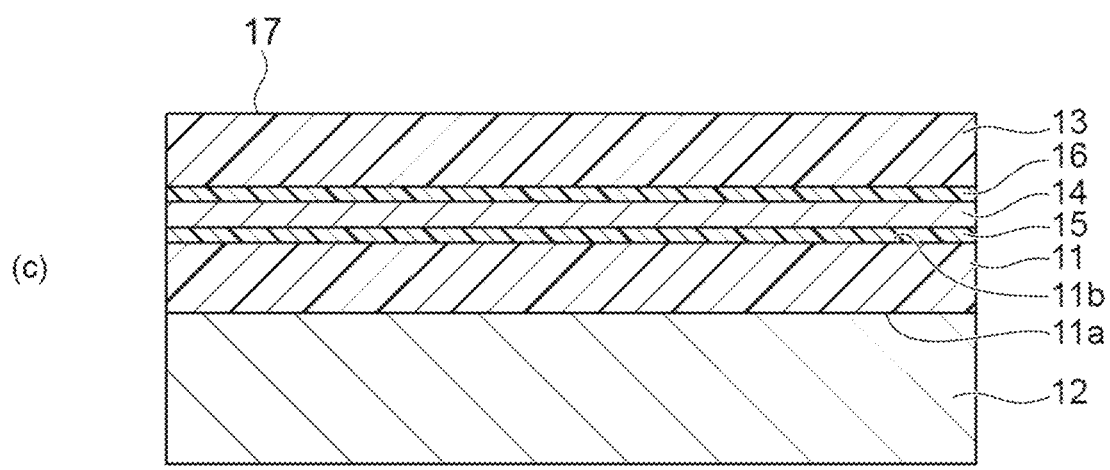
Figure 3:
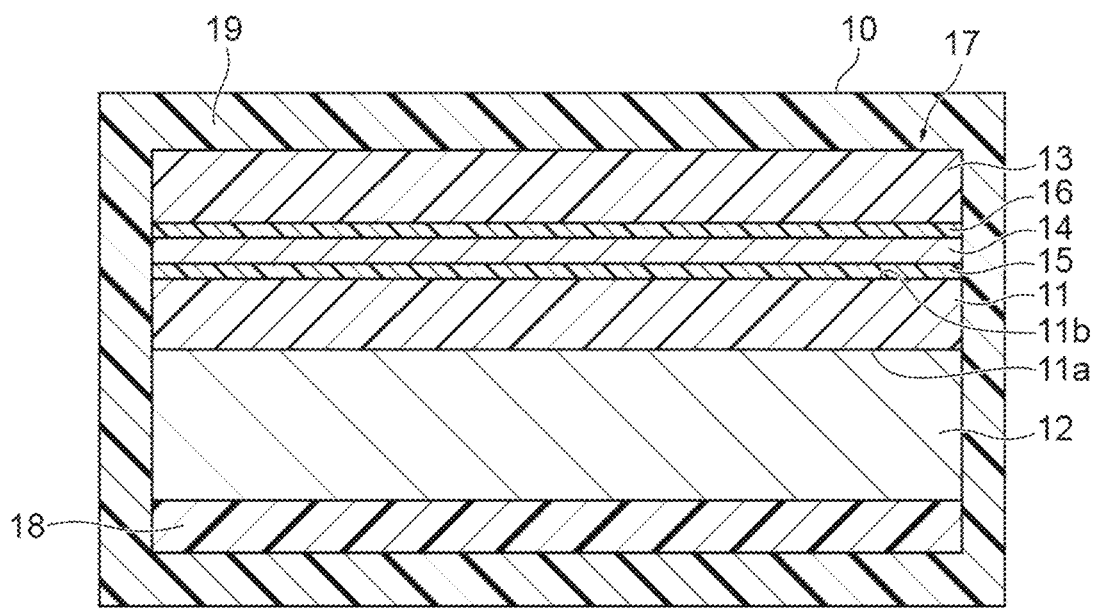
FIG. 3 is a schematic cross-sectional view illustrating one step of the method for manufacturing the radiation detector illustrated in FIG. 1.
Figure 3:
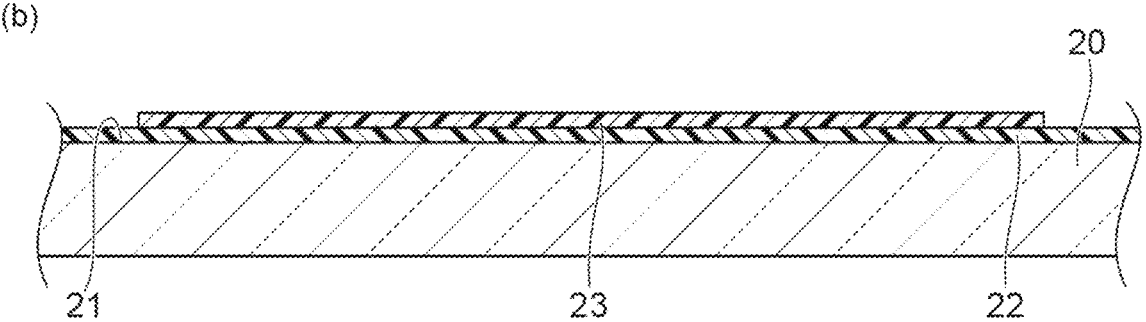

A method for manufacturing the radiation detector according to the present embodiment will be described below. FIGS. 2 and 3 are schematic cross-sectional views illustrating one step of the method for manufacturing the radiation detector 1 illustrated in FIG. 1. As illustrated in FIGS. 2 and 3, in this manufacturing method, a first step of preparing the scintillator panel 10 and a second step of preparing the sensor panel 20 are carried out first. The first step and the second step may be carried out in any order. The first step is a method for manufacturing the scintillator panel according to the present embodiment.

In the first step, a third step of preparing a first structure P1 and a fourth step of preparing a second structure P2 are carried out first as illustrated in FIGS. 2(a) and 2(b). The third step and the fourth step may be carried out in any order. In the third step, the first structure P1 is configured by the inorganic layer 14 being bonded to one surface of the second flexible support body 13 by the second adhesive layer 16. In other words, the third step is a step of preparing the second flexible support body 13 provided with the inorganic layer 14. In the fourth step, the second structure P2 is configured by the scintillator layer 12 being formed on the first surface 11a of the first flexible support body 11 by, for example, an evaporation method.

As illustrated in FIG. 2(c), in the first step, a fifth step of configuring the laminated body 17 by laminating the first structure P1 and the second structure P2 on each other is carried out subsequently. In the fifth step, the first structure P1 is bonded to the second structure P2 by the first adhesive layer 15 such that the inorganic layer 14 is interposed between the second surface 11b of the first flexible support body 11 and the second flexible support body 13. Here, the inorganic layer 14 is bonded to the second surface 11b.

As illustrated in FIG. 3(a), in the first step, a sixth step of configuring the scintillator panel 10 by providing the protective layers 18 and 19 with respect to the laminated body 17 is carried out subsequently. In the sixth step, the protective layer 18 is formed first on the surface of the scintillator layer 12 on the side opposite to the first flexible support body 11 (one surface of the laminated body 17). In the sixth step, the protective layer 19 is subsequently formed so as to cover the entire laminated body 17 and the entire protective layer 18. The scintillator panel 10 is manufactured as a result.

Meanwhile, in the second step, the sensor panel 20 is prepared as illustrated in FIG. 3(b). The third adhesive layer 23 is provided on the mounting surface 21 of the sensor panel 20 via the protective layer 22.

Then, in this manufacturing method, a seventh step of providing the scintillator panel 10 on the sensor panel 20 after the first step and the second step is carried out. In the seventh step, the scintillator panel 10 is provided on the sensor panel 20 such that the first surface 11a is on the sensor panel 20 side with respect to the second surface 11b of the first flexible support body 11. More specifically, in a state where the surface of the scintillator layer 12 on the side opposite to the first flexible support body 11 faces the mounting surface 21, the surface is bonded to the mounting surface 21 by the third adhesive layer 23 (via the protective layers 18, 19, and 22). The radiation detector illustrated in FIG. 1 is manufactured as a result.

Figure 4:
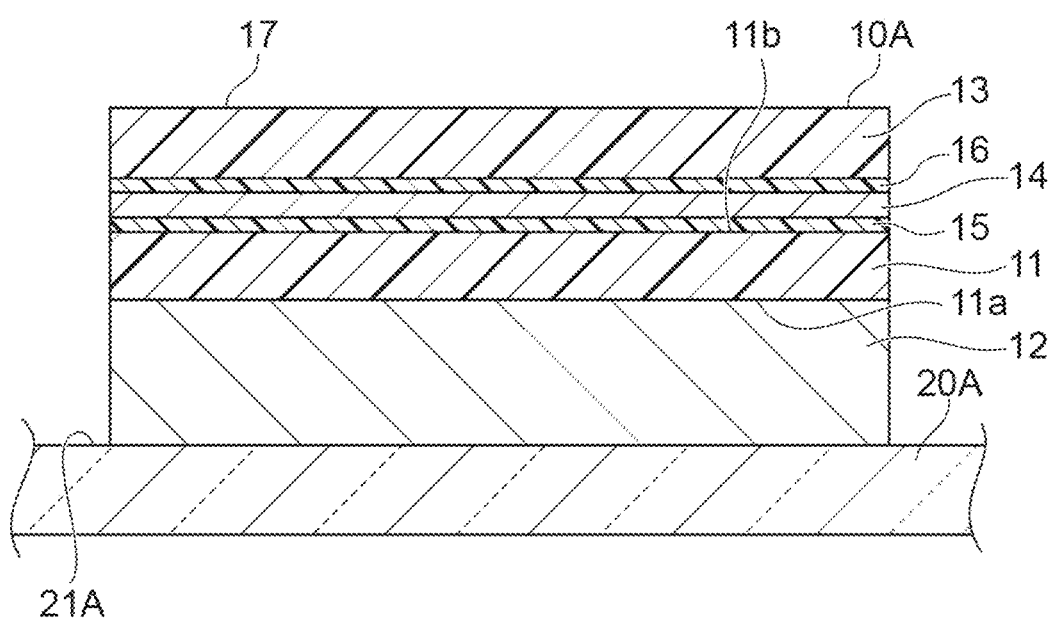
FIG. 4 is a diagram for describing a moisture resistance-related effect.
Figure 4:
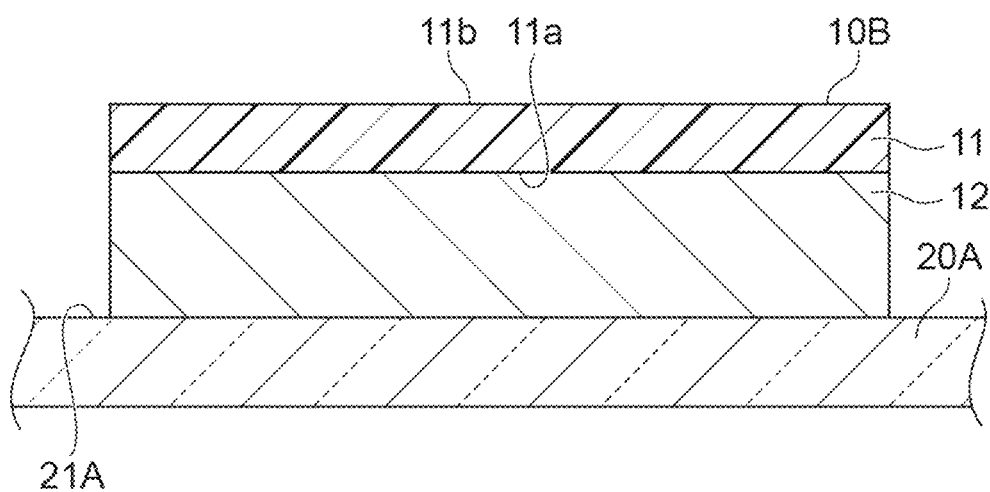
Figure 5:
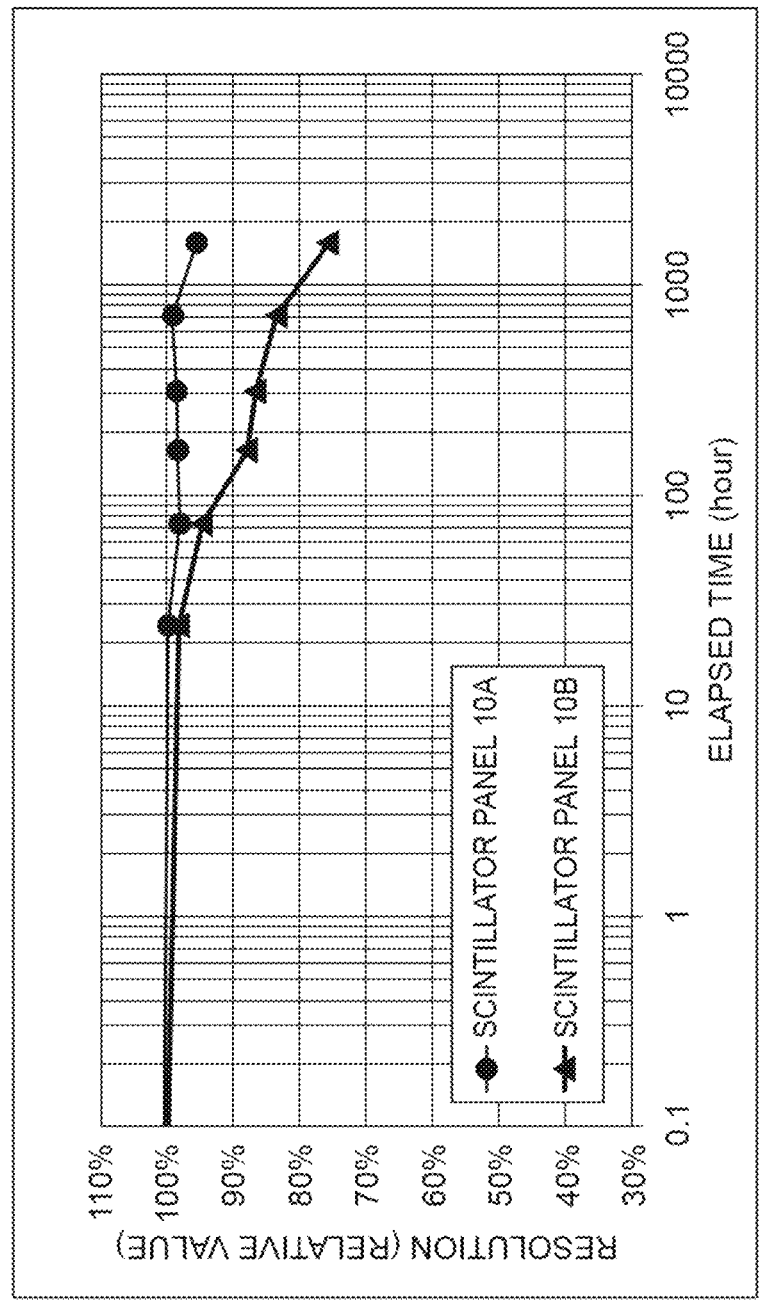
FIG. 5 is a diagram for describing the moisture resistance-related effect.

FIGS. 4 and 5 are diagrams for describing a moisture resistance-related effect. FIG. 4(a) is a schematic cross-sectional view of a scintillator panel 10A according to an embodiment, and FIG. 4(b) is a schematic cross-sectional view of a scintillator panel 10B according to a comparative example. The scintillator panel 10A is the same as the scintillator panel 10 except that the protective layers 18 and 19 are not provided. The scintillator panel 10B differs from the scintillator panel 10A in that the scintillator panel 10B does not include the inorganic layer 14 and the second flexible support body 13. Both the scintillator panels 10A and 10B are mounted on a mounting surface 21A of a glass substrate 20A for testing.

As illustrated in FIG. 5, in each of the scintillator panel 10A and the scintillator panel 10B according to the comparative example, the resolution declines with time due to the deliquescence of the scintillator layer 12 attributable to moisture infiltration from the side surface. However, the decline in resolution in the scintillator panel 10A is suppressed as compared with the scintillator panel 10B. It is conceivable that this is because the inorganic layer 14 suppresses the moisture infiltration from the side opposite to the glass substrate 20A.

As described above, in the scintillator panel 10, the scintillator layer 12 is formed on the first surface 11a of the first flexible support body 11. Meanwhile, the inorganic layer 14 is provided on the second surface 11b of the first flexible support body 11 via the first adhesive layer 15. Accordingly, in the scintillator panel 10, the inorganic layer 14 suppresses moisture infiltration from the second surface 11b side into the scintillator layer 12 via the first flexible support body 11. Meanwhile, the inorganic layer 14 may deteriorate due to contact during handling if the inorganic layer 14 is exposed.

On the other hand, the second flexible support body 13 in the scintillator panel 10 is disposed on the side of the inorganic layer 14 opposite to the second surface 11b of the first flexible support body 11, and thus the inorganic layer 14 is protected from contact and deterioration of the inorganic layer 14 is suppressed during handling. In this manner, in the scintillator panel 10, moisture resistance is improved while handleability is ensured. It should be noted that the side of the scintillator layer 12 opposite to the first surface 11a of the first flexible support body 11 is usually provided with the sensor panel 20 and so on and thus the necessity of moisture resistance improvement is relatively low.

In addition, the scintillator panel 10 includes the protective layer 19 provided so as to cover the laminated body 17 including the first flexible support body 11, the scintillator layer 12, the second flexible support body 13, and the inorganic layer 14. Accordingly, the overall moisture resistance and handleability are further improved.

In addition, the scintillator panel 10 includes the second adhesive layer 16 bonding the inorganic layer 14 and the second flexible support body 13 to each other. Accordingly, the joining between the inorganic layer 14 and the second flexible support body 13 becomes stronger than in a case where, for example, the inorganic layer 14 is formed by evaporation with respect to the second flexible support body 13.

In addition, in the scintillator panel 10, the thicknesses T11 and T13 of the first flexible support body 11 and the second flexible support body 13 in the first direction intersecting with the first surface 11a are 50 μm or more and 250 μm or less. In addition, the thickness T14 of the inorganic layer 14 in the first direction is 10 μm or more and 100 μm or less and is smaller than the thicknesses T11 and T13 of the first flexible support body 11 and the second flexible support body 13 in the first direction. By configuring the thickness T14 of the inorganic layer 14 relatively large in the range in which the inorganic layer 14 is thinner than the first flexible support body 11 and the second flexible support body 13 as described above, radiolucency can be ensured and moisture resistance can be further improved at the same time. In addition, a pinhole is likely to be generated in the inorganic layer 14 and moisture resistance is likely to be impaired if the thickness T14 of the inorganic layer 14 is, for example, approximately several hundred nanometers.

In addition, in the scintillator panel 10, the difference between the thickness T11 of the first flexible support body 11 and the thickness T13 of the second flexible support body 13 in the first direction is 0 or more and 90 μm or less. Accordingly, the overall warpage is suppressed since the difference in thickness is small between the first flexible support body 11 and the second flexible support body 13.

In addition, the radiation detector 1 includes the scintillator panel 10. Accordingly, with the radiation detector 1, handleability is ensured and moisture resistance is improved at the same time.

In addition, the scintillator layer 12 is formed on the first surface 11a of the first flexible support body 11 by the scintillator panel manufacturing method according to the present embodiment. Meanwhile, the inorganic layer 14 is provided on the second surface 11b of the first flexible support body 11 via the first adhesive layer 15. Accordingly, in the scintillator panel 10 obtained by this manufacturing method, the inorganic layer 14 suppresses moisture infiltration from the second surface 11b side into the scintillator layer 12 via the first flexible support body 11. Meanwhile, the inorganic layer 14 may deteriorate due to contact during handling if the inorganic layer 14 is exposed.

On the other hand, by this manufacturing method, the second flexible support body 13 is disposed on the side of the inorganic layer 14 opposite to the second surface 11b of the first flexible support body 11, and thus the inorganic layer 14 is protected from contact and deterioration of the inorganic layer 14 is suppressed during handling. In this manner, the scintillator panel 10 capable of improving moisture resistance while ensuring handleability is manufactured by this manufacturing method. It should be noted that the side of the scintillator layer 12 opposite to the first surface 11a of the first flexible support body 11 is usually provided with the sensor panel 20 and so on and thus the necessity of moisture resistance improvement is relatively low.

Further, the scintillator panel 10 is used in the radiation detector manufacturing method according to the present embodiment. Accordingly, the radiation detector 1 capable of improving moisture resistance while ensuring handleability is manufactured.

One form of the present disclosure has been described in the above embodiment. Accordingly, the present disclosure is not limited to the above embodiment and various modifications can be made.

INDUSTRIAL APPLICABILITY

According to the present disclosure, a scintillator panel, a radiation detector, a scintillator panel manufacturing method, and a radiation detector manufacturing method enabling moisture resistance improvement while ensuring handleability are provided.

REFERENCE SIGNS LIST

1: radiation detector, 10: scintillator panel, 11: first flexible support body, 11a: first surface, 11b: second surface, 12: scintillator layer, 13: second flexible support body, 14: inorganic layer, 15: first adhesive layer, 16: second adhesive layer, 18, 19: protective layer, 20: sensor panel, 21: mounting surface.

The invention claimed is:

1. A scintillator panel comprising:
a first flexible support body having a first surface and a second surface on a side opposite to the first surface;
a scintillator layer formed on the first surface and containing a plurality of columnar crystals;
a second flexible support body provided on the second surface;
an inorganic layer provided on the second flexible support body so as to be interposed between the second surface and the second flexible support body; and
a first adhesive layer bonding the second surface and the inorganic layer to each other,
wherein the first flexible support body and the second flexible support body have a thickness of 50 μm or more and 250 μm or less in a first direction intersecting with the first surface, and
wherein the inorganic layer has a thickness of 10 μm or more and 100 μm or less in the first direction and is thinner than the first flexible support body and the second flexible support body in the first direction.

2. The scintillator panel according to claim 1, comprising a protective layer provided so as to cover the first flexible support body, the scintillator layer, the second flexible support body, and the inorganic layer.

3. The scintillator panel according to claim 1, comprising a second adhesive layer bonding the inorganic layer and the second flexible support body to each other.

4. The scintillator panel according to claim 1, wherein a difference between the thickness of the first flexible support body and the thickness of the second flexible support body in the first direction is 0 or more and 90 μm or less.

5. The scintillator panel according to claim 1, wherein the inorganic layer contains Al, Cu, Ti, Fe, or SUS as a material.

6. The scintillator panel according to claim 1, wherein the first flexible support body and the second flexible support body contain PET, PEN, PI, PP, PE, or PMMA as a material.

7. A radiation detector comprising:
the scintillator panel according to claim 1; and
a sensor panel including a photoelectric conversion element,
wherein the scintillator panel is provided on the sensor panel such that the first surface is on the sensor panel side with respect to the second surface.

8. A radiation detector manufacturing method comprising:
a step of preparing the scintillator panel according to claim 1;
a step of preparing a sensor panel including a photoelectric conversion element; and
a step of providing the scintillator panel on the sensor panel such that the first surface is on the sensor panel side with respect to the second surface.

9. A scintillator panel manufacturing method comprising:
a step of forming a scintillator layer containing a plurality of columnar crystals on a first surface of a first flexible support body by an evaporation method;
a step of preparing a second flexible support body provided with an inorganic layer; and
a step of bonding the inorganic layer to the first flexible support body with a first adhesive layer such that the inorganic layer is interposed between a second surface of the first flexible support body on a side opposite to the first surface and the second flexible support body,
wherein the first flexible support body and the second flexible support body have a thickness of 50 μm or more and 250 μm or less in a first direction intersecting with the first surface, and
wherein the inorganic layer has a thickness of 10 μm or more and 100 μm or less in the first direction and is thinner than the first flexible support body and the second flexible support body in the first direction.

* * * * *